(12) United States Patent
Swadling

(10) Patent No.: US 6,994,266 B2
(45) Date of Patent: Feb. 7, 2006

(54) FLOW MIXER SHUTTLE

(75) Inventor: Jeremy Philip Swadling, Hampshire (GB)

(73) Assignee: Valquest Limited, Rowlands Castle (GB)

( * ) Notice: Subject to any disclaimer, the term of this patent is extended or adjusted under 35 U.S.C. 154(b) by 0 days.

(21) Appl. No.: 10/501,290

(22) PCT Filed: Jan. 8, 2003

(86) PCT No.: PCT/GB03/00043

§ 371 (c)(1),
(2), (4) Date: Apr. 11, 2005

(87) PCT Pub. No.: WO03/058367

PCT Pub. Date: Jul. 17, 2003

(65) Prior Publication Data

US 2005/0173546 A1 Aug. 11, 2005

(30) Foreign Application Priority Data

Jan. 11, 2002 (GB) .................................... 0200521
May 17, 2002 (GB) .................................... 0211374

(51) Int. Cl.
*G05D 23/13* (2006.01)

(52) U.S. Cl. ................................ 236/12.11; 236/12.16; 137/625.4

(58) Field of Classification Search ............. 236/12.11, 236/12.12, 12.16, 12.2, 12.15; 137/625.4
See application file for complete search history.

(56) References Cited

U.S. PATENT DOCUMENTS

| 5,148,976 A | 9/1992 | Reid |
| 6,315,210 B1 * | 11/2001 | Kline ........................ 236/12.2 |
| 2004/0238650 A1 * | 12/2004 | Luig et al. ............... 236/12.11 |

FOREIGN PATENT DOCUMENTS

| EP | 1 246 039 | 10/2002 |
| GB | 2 096 274 | 10/1982 |

* cited by examiner

*Primary Examiner*—Marc Norman
(74) *Attorney, Agent, or Firm*—Alfred A. Fressola; Ware, Fressola, Van Der Sluys & Adolphson LLP

(57) ABSTRACT

A flow mixer shuttle having first and second annular rims for controlling the flow of hot and cold water, a central hub connected to the rims, a seat on the hub for supporting a thermostatic capsule for controlling the position of the shuttle to control the flow of hot and cold water, and a flow directing sleeve for directing mixer flow to the flange end of the capsule. A flow mixer incorporating the shuttle is also described, as is a single control flow mixer.

8 Claims, 2 Drawing Sheets

FLOW MIXER SHUTTLE

CROSS REFERENCE TO RELATED APPLICATION

This application is for entry into the U.S. national phase under §371 for International Application No. PCT/GB03/00043 having an international filing date of Jan. 08, 2003, and from which priority is claimed under all applicable sections of Title 35 of the United States Code including, but not limited to, Sections 120, 363 and 365(c), and which in turn claims priority under 35 USC §119 to United Kingdom Patent Application No. 0211374.4 filed on May 17, 2002 and United Kingdom Patent Application No. 0200521.3 filed on Jan. 11, 2002.

TECHNICAL FIELD

The present invention relates to a shuttle for a flow mixer and a mixer for two liquid flows at different temperatures, particularly though not exclusively for thermostatic mixing of water in a shower.

BACKGROUND OF THE INVENTION

It is known to employ a thermostatic capsule to move a shuttle to open or close small gaps on either side of the shuttle. It is convenient for this shuttle to be circular with the gaps being annular, but this gives rise to other problems. Conventionally the thermostatic capsule has:
  a circularly cylindrical, copper sheath containing thermostatic wax,
  a location flange at the inner end of the copper sheath,
  a spigot extending from the location flange oppositely from the sheath and
  a push rod extending from the spigot by an amount varying in accordance with the ambient temperature at the copper sheath.

The inlet to the annular gaps is conveniently radially inwards. Normally, the cold water flows in upstream of the hot water, whereby as the combined flow is turned to flow axially along the copper sheath of the thermostatic capsule, the cold water tends to flow closer to the capsule than the hot water. At least this is the situation close to the flange of the capsule that is its most sensitive part. Further downstream, the flow mixes better, so that the tail end of the capsule experiences a more representative temperature of the actual mixed water flow. Should the normal situation be reversed and hot water flow in upstream of the cold water, the same problem of the capsule not experiencing mixed water temperature at its flange end of the copper sheath will obtain.

SUMMARY OF THE INVENTION

The object of the invention is to provide an improved shuttle for a flow mixer, in which the hot and cold flows are mixed further upstream with respect to their impingement on the thermostatic capsule, whereby the capsule is shielded from undiluted cold water flow and experiences a temperature more representative of the final mixed flow and its sensitivity in controlling water temperature is improved.

According to the invention there is provided a shuttle for a flow mixer having a thermostatic capsule, the shuttle comprising:
  a first annular rim for controlling flow of hot water;
  a second annular rim for controlling flow of cold water;
  a hub connected with the rims;
  a seat on the hub for supporting the thermostatic capsule at its flange with its sheath extending downstream of water flow past it and its push rod arranged for axial movement of the capsule to control the position of the shuttle; and
  a flow directing sleeve carried on the shuttle and extending at least partially about and at least substantially parallel to the sheath for directing mixed flow to the flange end of the sheath.

In use, the flow-directing sleeve will co-operate with features of the mixer to assist in direction of the flow.

In the preferred embodiment, the sleeve is imperforate directing the flow along its length, a complementary sleeve being provided in the mixer for directing the flow back inside the shuttle sleeve to the flange region of the sheath and thence along the sheath.

According to the invention there is also provided a flow mixer comprising:
  a shuttle of the invention;
  a thermostatic capsule for controlling the position of the shuttle in accordance with ambient flow temperature;
  means for locating the flange of the capsule in the seat of the shuttle;
  a shuttle return spring for urging the shuttle and capsule combination to return from expansion movement caused by extension of the push rod with respect to the spigot;
  a shuttle barrel, in which the shuttle is slidably mounted, the barrel having:
    a land co-operating with the shuttle to direct hot flow to the hot flow annular rim of the shuttle and cold flow to the cold flow annular rim of the shuttle and
    complementary hot and cold flow annular rims for controlling the hot and cold flows in co-operation with the shuttle's rims; and
  at least one flow direction feature for co-operating with the sleeve of the shuttle to direct the flow to the thermostatic capsule to the flange region of its sleeve.

In one embodiment, the flow direction feature is a complementary sleeve directing the flow which has passed along the outside of the shuttle sleeve back inside it to the flange region of the sheath and thence along the sheath.

Preferably the capsule flange locating means includes an over-travel spring acting between the shuttle and the spigot of the capsule, with a force greater than that of the return spring, for accommodating sudden changes in flow conditions causing the shuttle to be stopped by abutment against either of the annular flow rims.

BRIEF DESCRIPTION OF THE DRAWINGS

To help understanding of the invention, two specific embodiments thereof will now be described by way of example and with reference to the accompanying drawings, in which.

DETAILED DESCRIPTION

Figure 1:
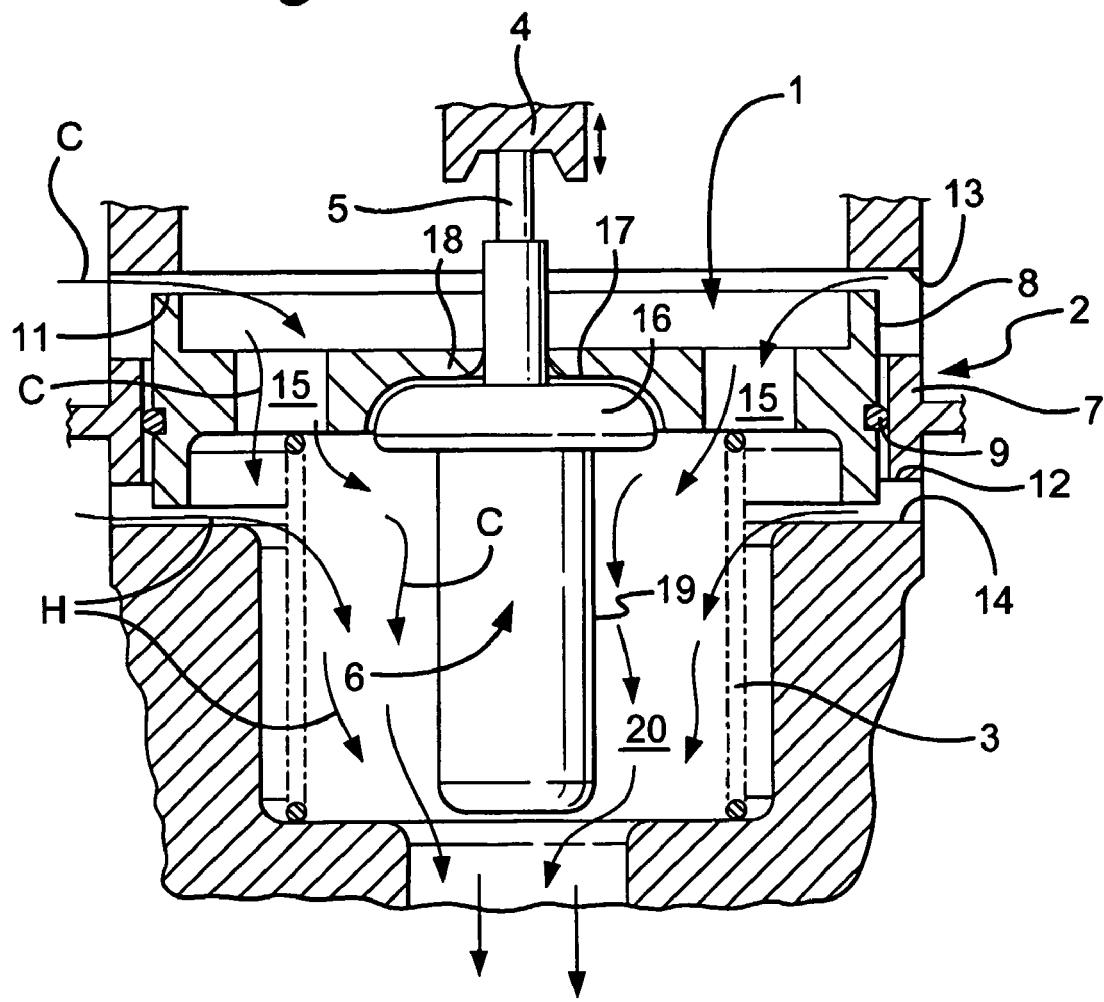
FIG. 1 is a cross-sectional side view of a conventional flow mixer showing the shuttle.

Referring first to FIG. 1, a conventional shuttle 1 and barrel 2 arrangement is shown, the shuttle being slidable in the barrel under control a shuttle spring 3 and an adjustable temperature control abutment 4 against which the push rod 5 of a thermostatic capsule 6 abuts. The barrel has a land 7 with which the periphery 8, carrying an O-ring 9, of the shuttle sealingly co-operates.

The shuttle has first and second annular rims 11,12 for co-operating with complementary rims 13,14 on either side of the land for controlling flow of cold and hot water into the barrel. Arrangements for leading water to the barrel and from the barrel and for the adjustable abutment 4 will be within the abilities of the man skilled in the art and will not be described here.

In this conventional design of FIG. 1, the cold water enters the barrel between the upper rims 11,13 and passes through apertures 15 in the shuttle. It flows close to the thermostatic capsule 6, which is supported at its flange 16 on a seat 17 in a hub 18 central on the shuttle. The hot water flows between the lower rims 12,14. The combined flow then turns along the sheath 19 of the capsule, in a comparatively wide bore 20 in the barrel. The hot water enters the barrel outwardly of where the cold water passes through the shuttle. Thus the two temperature flows C, H tend to remain separate, at least until they reach the tail end of the capsule. It is believed that the most sensitive region of the sheath, i.e. at the flange experiences mostly cold water. The capsule is therefore believed not to be as sensitive as it might be to temperature control adjustments.

Figure 2:
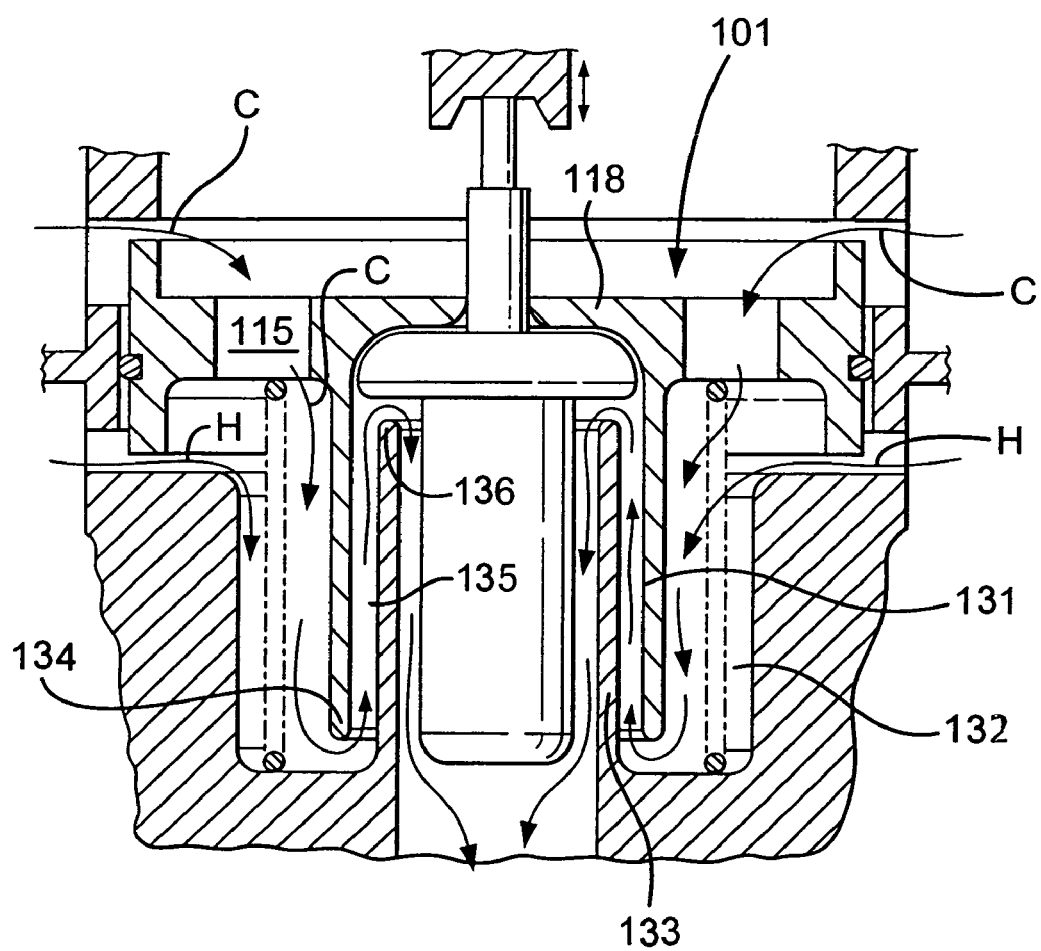
FIG. 2 is a similar view of a mixer improved in accordance with the invention.

Turning now to FIG. 2, the shuttle 101 according to the invention shown there has a sleeve 131 extending from the hub 118 of the shuttle inwards of the cold water apertures 115. Thus the cold flow C is directed along the outside of the sleeve, as indeed is the hot flow H. However they are in a comparatively narrow annular passage 132. Inwards of the sleeve 131, a second sleeve 133 extends up from a low region of the barrel. The combined flows are directed around the distal end 134 of the sleeve 131 and back within it in a second narrow annular passage 135. In these two passages, which are comparatively long, the hot and cold flows become mixed. This mixed flow passes the distal end 136 of the inner sleeve and impinges on the thermostatic capsule at its most sensitive region, namely the flange end of the sheath. Thus the shuttle is rendered more sensitive to changes in temperature of the incoming water flow, as for instance when the hot water first reaches the mixer.

What is claimed is:

1. A shuttle for a flow mixer having a thermostatic capsule, the shuttle comprising:
   a first annular rim for controlling flow of hot water;
   a second annular rim for controlling flow of cold water;
   a hub connected with the rims;
   a seat on the hub for supporting the thermostatic capsule at its flange with its sheath extending downstream of water flow past it and its push rod arranged for axial movement of the capsule to control the position of the shuttle; and
   a flow directing sleeve carried on the shuttle and extending at least partially about and at least substantially parallel to the sheath for directing mixed flow to the flange end of the sheath.

2. A shuttle as claimed in claim 1, wherein the sleeve is imperforate directing the flow along its length, a complementary sleeve being provided in the mixer for directing the flow back inside the shuttle sleeve to the flange region of the sheath and thence along the sheath.

3. A flow mixer comprising:
   a shuttle as claimed in claim 1;
   a thermostatic capsule for controlling the position of the shuttle in accordance with ambient flow temperature;
   means for locating the flange of the capsule in the seat of the shuttle;
   a shuttle return spring for urging the shuttle and capsule combination to return from expansion movement caused by extension of the push rod with respect to the spigot;
   a shuttle barrel, in which the shuttle is slidably mounted, the barrel having:
      a land co-operating with the shuttle to direct hot flow to the hot flow annular rim of the shuttle and cold flow to the cold flow annular rim of the shuttle and
      complementary hot and cold flow annular rims for controlling the hot and cold flows in co-operation with the shuttle's rims; and
   at least one flow direction feature for co-operating with the sleeve of the shuttle to direct the flow to the thermostatic capsule to the flange region of its sleeve.

4. A flow mixer as claimed in claim 3, wherein the flow direction feature is a complementary sleeve directing the flow which has passed along the outside of the shuttle sleeve back inside it to the flange region of the sheath and thence along the sheath.

5. A flow mixer as claimed in claim 3, wherein the capsule flange locating means includes an over-travel spring acting between the shuttle and the spigot of the capsule, with a force greater than that of the return spring, for accommodating sudden changes in flow conditions causing the shuttle to be stopped by abutment against either of the annular flow rims.

6. A flow mixer comprising:
   a shuttle as claimed in claim 2;
   a thermostatic capsule for controlling the position of the shuttle in accordance with ambient flow temperature;
   means for locating the flange of the capsule in the seat of the shuttle;
   a shuttle return spring for urging the shuttle and capsule combination to return from expansion movement caused by extension of the push rod with respect to the spigot;
   a shuttle barrel, in which the shuttle is slidably mounted, the barrel having:
      a land co-operating with the shuttle to direct hot flow to the hot flow annular rim of the shuttle and cold flow to the cold flow annular rim of the shuttle and
      complementary hot and cold flow annular rims for controlling the hot and cold flows in co-operation with the shuttle's rims; and
   at least one flow direction feature for co-operating with the sleeve of the shuttle to direct the flow to the thermostatic capsule to the flange region of its sleeve.

7. A flow mixer as claimed in claim 6, wherein the flow direction feature is a complementary sleeve directing the flow which has passed along the outside of the shuttle sleeve back inside it to the flange region of the sheath and thence along the sheath.

8. A flow mixer as claimed in claim 6, wherein the capsule flange locating means includes an over-travel spring acting between the shuttle and the spigot of the capsule, with a force greater than that of the return spring, for accommodating sudden changes in flow conditions causing the shuttle to be stopped by abutment against either of the annular flow rims.

* * * * *